United States Patent Office 2,995,541
Patented Aug. 8, 1961

2,995,541
CURING AGENT FOR UREA RESINS
Edward L. Kropa, Greensboro, N.C., and George E. Cremeans, Magnetic Springs, Ohio, assignors, by mesne assignments, to Esso Research and Engineering Company, Washington, D.C., a corporation of Delaware
No Drawing. Filed Nov. 22, 1957, Ser. No. 698,041
7 Claims. (Cl. 260—77.5)

This invention relates to improved urea resins and to a process for preparing the same. More particularly, the invention relates to films from urea resins cured with trimethylolalkanes and to the process for curing such films.

The condensation product of urea with formaldehyde is well known in the coatings industry. This product has become generally termed as a "urea resin," although "urea resins" include the condensation products of other urea and aldehydic components.

The urea component may be urea, thiourea, iminourea (guanidine), and substituted derivatives thereof, such as methyl urea, acetyl urea, benzoyl urea, phenylthiourea, asymmetrical diethyl urea, allyl urea, 2-chloro allyl urea, ethylidene urea, methylol urea, methylene urea, ethylene urea, acetylene urea, cyanuric acid, dicyandiamide, guanylurea, guanylthiourea, biguanidine, aminoguanidine, creatine, guanoline, and other aldehyde-reactable substituted ureas, thioureas, guanidines, and mixtures thereof. Urea itself is preferred.

The aldehydic component may be formaldehyde, paraformaldehyde, acetaldehyde, propionaldehyde, butyraldehyde, acrolein, methacrolein, crotonaldehyde, etc., and mixtures thereof. The shorter chain aldehydes, i.e., $C_1$ to $C_3$ are preferred, and formaldehyde is especially preferred.

For purposes of simplicity and illustration, the urea and aldehydic components will be referred to herein as urea and formaldehyde respectively; however, the invention is not intended to be limited thereto.

There are many variables involved in the production of urea resins, and the exact chemistry is quite involved. However, the basic reactions may be shown as follows:

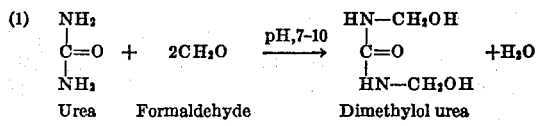

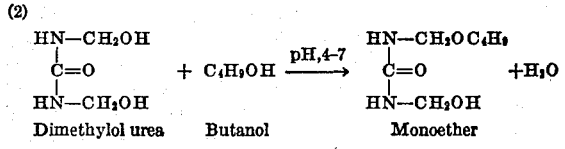

Urea is first reacted in alkaline aqueous media at a pH of 7 to 10 with formaldehyde to yield dimethylolurea. The condensation reaction conditions include a reaction temperature between 20° and 75° C., preferably 20° to 30° C. A urea/formaldehyde feed ratio of between 1:1 and 1:2 is generally used, preferably between 1:1.5 and 1:1.7. The alkaline solution may be provided by any suitable basic substance such as sodium hydroxide, potassium hydroxide, sodium formate, etc. The dimethylol urea itself may be polymerized to form a urea resin, but the dimethylol urea is generally first etherified with minor proportions of an aliphatic monohydric alcohol in order to increase its solubility in hydrocarbon solvents, such as mineral spirits and the like, and to improve its compatibility with oil-soluble resins, e.g., alkyd resins.

The etherification reaction, represented by Equation (2) above, is conducted in the presence of an acid catalyst, e.g. at a pH of 4 to 7, at a temperature between about 80° and 200° C., preferably 95° to 150° C. Usually about 0.1 to 0.4 mole of alcohol are reacted per mole of dimethylolurea, preferably 0.1 to 0.15 mole per mole. The polymerization tendencies of the dimethylolurea are not substantially affected by the etherification step, but when butyl alcohol, the preferred etherification agent, is used, the resulting ester is somewhat more easily polymerized by heat, and at the same time has high compatibility with alkyd resins. Octyl alcohol, on the other hand, tends to give a product with higher tolerance for mineral spirits and other hydrocarbon solvents. Aliphatic alcohols having 1 to 13 carbon atoms, preferably 3 to 8 carbon atoms, such as propyl, butyl, amyl, hexyl, octyl, etc., are suitable etherification agents. When the higher alcohols are employed as the primary etherification agents, methyl alcohols may also be employed to effect transetherification.

The polymerization of the etherified dimethylolurea is conducted by baking under slightly acidic conditions at temperatures of about 65° to 200° C., preferably 125° to 150° C. If the unetherified dimethylolurea is polymerized, the conditions are the same as above. In either case, the polymerization reaction involves a complex cross linking in which alcohol is split out from the etherified dimethylol ureas and water from the unetherified. The resulting resin is thermoset and relatively hard, but its flexibility and adhesion characteristics are rather poor. Therefore, unmodified urea resins are not suitable for most commercial applications such as for protective coatings.

Flexibility has been somewhat improved by incorporating into the urea resin a portion of an oil-soluble resin such as an alkyd resin. The alkyd resin in solution form may be blended into solutions of the partially polymerized etherified or unetherified dimethylolurea. The blend is baked at the polymerization conditions given above. The hydroxyl group of the alkyd resin probably enter into the reaction, thereby actually resulting in a modified polymer. The modified polymer has improved flexibility, but large proportions of the alkyd resin are required and the resistance of the alkyd resin to alkaline hydrolysis is low.

It is an object of this invention to provide urea resins of improved flexibility, substantially undiminished hardness, and high resistance to alkaline hydrolysis. Further, it is an object of this invention to find resin modifiers, of which only small amounts are required, to improve the properties of urea resins. These and other objects will become more clearly apparent after the following detailed description of the present invention.

It has now been found that the unique structure of 1,1,1-trimethylolalkanes renders them peculiarly superior as cross-linking agents as well as plasticizing agents in the afore-described urea resins. The 1,1,1-trimethylolalkanes contain 5 to 13, preferably 8 to 11 carbon atoms and may be represented by the following formula:

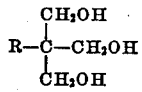

wherein R is an alkyl group, having 1 to 9, preferably 4 to 7, carbon atoms. Examples of suitable trimethylolalkanes are trimethylolethane, trimethylolpropane, trimethylol-n-butane, trimethylolisobutane, trimethylolpentanes, trimethylolhexanes, trimethylolheptanes, trimethylol-n-octane, trimethylolisooctanes, etc.

Other type polyols, such as dimethylols or even trimethylols not having the above 1,1,1 configuration, are not satisfactory for this invention, and thus the 1,1,1-trimethylols must be obtained in a reasonably pure form, i.e., at least 95% pure, preferably about 100% pure. Undesirable impurities are mono and diols, secondary alcohols, and the like. The trimethylol alkanes may be prepared by the reaction of formaldehyde with another aldehyde under basic conditions, or by other means known in the art.

The primary hydroxyl groups of the trimethylols useful in this invention are active enough to take part in the polymerization reaction, thereby forming modified urea resins. At the same time, the carbon chain (the R—$\overset{|}{\underset{|}{C}}$— group in the above formula)

has a plasticizing effect on the modified resin, thereby improving its flexibility and adhesion characteristics. This modifier, free of other functional groups, also renders the resin more resistant to alkaline hydrolysis and the like.

The urea resins are generally available in the dimethylolurea form, the etherified dimethylolurea form, or in a partially polymerized form of either the dimethylolurea or the etherified dimethylolurea. It has been found that the best results of this invention are obtained when the trimethylolalkane is added to any of the above forms in an amount between 5 and 30%, based on the final modified resin, preferably 5 to 15%, and the resulting admixture is polymerized to completion. Solutions of partially polymerized etherified dimethylolurea in hydrocarbon, alcohol, or other solvents are the preferred forms to which the polyols are added. The mixture is baked at a temperature between 65° and 200° C., preferably between 125° and 150° C. At temperatures below 65° C., the resins will not cure within practical baking periods.

The incorporation of the trimethylolalkanes in the urea resins makes unnecessary the addition of alkyd resins. At the same time, the present modified resins are superior to the alkyd resin modified urea resins in numerous ways which will become apparent upon reference to the following examples.

Unless otherwise designated, all ratios and percentages are given throughout on a weight basis.

EXAMPLE I

A commercial butylated urea resin, American Cyanamid Beetle 227–8, was admixed with varying proportions of trimethylolheptane. The Beetle 227–8 resin is a 50% solution of a partially polymerized, butylated dimethylolurea in a solvent comprising a 3/2 volumetric ratio of butanol and xylene. The solution has a density of 8.3 pounds per gallon and an acid member of 1 to 4. The trimethylolheptane used was a pure, trifunctional alcohol, in which the alkane group was essentially straight-chained. The trimethylol had a hydroxyl value of 878 as compared to the theoretical value of 889, i.e., a purity of 98.8%. The polyol was dissolved in the commercial resin solution, which was then sheeted into films having a thickness of between .0005 and .001 inch, and the films were baked on tin plated steel panels in an oven at 275° F. (135° C.) for periods as indicated in Table I. The flexibility of the resulting films was compared by bending the panels over mandrels of varying diameter. The hardness of the films was also determined, based on 100 for plate glass.

Table A

| Polyol, Wt. Percent Based on Total Resin | Baked for 15 Min. | | Baked for 30 Min. | |
|---|---|---|---|---|
| | Flexibility a | Hardness b | Flexibility a | Hardness b |
| 0 (Control) | ⅝₁₆ | 50 | ⅞₁₆ | 50 |
| 5 | ⅛ | 44 | ⅜ | 48 |
| 10 | ⅛ | 40 | ⅝₁₆ | 48 |
| 15 | ⅛ | 36 | ⅞₁₆ | 40 |
| 20 | ⅛ | 32 | ⅛ | 40 |
| 30 | ⅛ | 30 | ⅛ | 40 |
| 40 | ⅛ | Tacky | ⅛ | 32 |
| 50 | ⅛ | Tacky | ⅛ | 30 |
| 75 | ⅛ | Tacky | ⅛ | 30 | a Number represents the diameter of the smallest mandrel over which the panel could be bent without damage to the film.
b Sward hardness based on plate glass=100.

The data in Table A indicate that when the urea resin is modified with trimethylolheptane, a coating film of improved flexibility may be obtained. It is also seen that the optimum range of trimethylol falls between 5% and 30%. Greater proportions cause excessive softening of the film, and lesser proportions fail to give the desired flexibility.

Following the same procedure, the following data in Table B were compiled to determine the optimum baking time at 135° C. and 5 to 15% trimethylolheptane.

Table B

| Baking Time, Min. | Polyol, Weight Percent Based on Total Resin | | | | | |
|---|---|---|---|---|---|---|
| | 5 | | 10 | | 15 | |
| | Flexibility a | Hardness b | Flexibility a | Hardness b | Flexibility a | Hardness b |
| 5 | 1 | 22 | ⅞₁₆ | 20 | ⅛ | 12 |
| 10 | ⅜ | 42 | ⅞₁₆ | 42 | ⅛ | 38 |
| 15 | ⅛ | 44 | ½ | 36 | ⅛ | 44 |
| 20 | ⅛ | 44 | ⅛ | 40 | ⅛ | 36 |
| 25 | ⅛ | 46 | ⅛ | 44 | ⅛ | 36 |
| 30 | ⅜ | 48 | ¼ | 48 | ¼ | 40 |
| 35 | ⅜ | | ⅝₁₆ | | ⅜ | |
| 40 | ⅝₁₆ | | ⅜ | | ⅝₁₆ | |
| 45 | ⅞₁₆ | | ⅜ | | ⅞₁₆ | |
| 50 | ⅞₁₆ | | ⅜ | | ⅞₁₆ | | a See footnote a, Table A.
b See footnote b, Table A.

This data shows that a baking time between 15 and 25 minutes is required, at the given temperature of 135° C. to obtain a satisfactory flexibility without excessively reducing the hardness. It should be realized, of course, that this observed preferred baking time of 15 to 25 minutes might vary with temperature. For instance, at temperatures as low as 65° C., baking might require 2 to 3 hours or longer, whereas at higher temperatures, e.g. 200° C., baking for 10 minutes or less may be sufficient.

In place of the commercial butylated urea resin of Example I there may be used other urea lacquers. For example, a suitable butylated urea lacquer may be prepared as follows:

A solution of 30 percent formalin was neutralized with sodium carbonate and adjusted to a pH 7.5. Ninety-four parts by volume of this solution were added to 30 parts by weight of urea, and the solution heated to 94° C., whereupon another solution comprising 100 parts by volume of n-butanol, 6 parts by volume of toluene, 10 parts of 30 percent formalin adjusted to pH 7.5 and containing 0.75 part by weight of phthalic anhydride were then added slowly in such a manner as to allow a mixture of butanol and water to distill. Gradually, as the water of condensation was driven out of the reaction mixture, the temperature rose; and when it had reached 100° C., 60 parts by volume of toluene containing 0.2 of a part by volume 25 percent hydrochloric acid in butanol was added subsequently to the mixture and the entire mass refluxed for one hour. Thereupon any water of condensation was again driven off azeotropically until a temperature of 115° C. was reached. The resulting lacquer was cut with toluene to about 50 percent solids. Such a resulting solution may be cured with a trimethylolalkane according to the process of the invention.

EXAMPLE II

The same procedure as followed in Example I was repeated with trimethylol-n-pentane as the modifier instead of trimethylolheptane. Two runs were made, one with trimethylolpentane, having a hydroxyl value of 983 as compared to the theoretical value of 1035, i.e., a purity of 95%, and the second sample having only a hydroxyl value of 806 or a purity of 78%, indicating a sizable quantity of dimethylolpentane. The films were baked at 135° C. for 15 minutes each. Both films contained 5% of the polyol based on the total resin. The results are as follows:

Table C

| Modifier | Flexibility a | Hardness b |
|---|---|---|
| Pure trimethylolpentane | 1/8 | 50 |
| Impure trimethylolpentane | 1/4 | Tacky | a See footnote (a), Table A.
b See footnote (b), Table A.

The data show that a pure trimethylol, i.e., at least 95% pure, is necessary for the present invention. When dimethylolalkanes are also present, the same high degree of flexibility and hardness is not obtained.

To substantiate this point, a repeat run was made using 5% of impure trimethylolheptane, having a hydroxyl value of only 680, or a purity of 76.5%. The resulting films failed to pass even the ¾-inch mandrel test, as compared to the successful ⅛-inch mandrel tests in Example I.

EXAMPLE III

Following the procedure of Example I, urea resin films modified with about 10% glycerin were prepared and tested. Upon baking these films for 20 minutes at 135° C., an average of the results indicated a hardness of 48, and the minimum size mandrel over which the films could be bent to be 1.0 inch. Thus, it is observed that glycerin-modified urea resins are not even so flexible as the unmodified urea resins seen in Table A. This is further evidence that it is the 1,1,1 positioning of the three primary hydroxyl groups in the trimethylolalkanes that is critical in the present invention.

EXAMPLE IV

The film panel of Example I which contained 5% trimethylolheptane and had been baked for 15 minutes was partly submerged into a boiling 25% solution of sodium hydroxide for 30 minutes. Upon removal from the solution and rinsing with distilled water, the portion of the film exposed to the alkaline solution showed essentially no change from the unexposed portion. The same observation resulted when films of higher polyol concentration were so treated. It is clearly evident that the trimethylol-modified urea films are extremely resistant to alkaline hydrolysis. This is probably because of the absence of ester linkages in the present modified resins.

EXAMPLE V

For purposes of comparison, a urea resin modified with an alkyd resin was prepared as follows. The American Cyanamid Beetle 227–8 resin solution, such as that used in the foregoing examples, was supplemented with varying amounts of the alkyd resin, American Cyanamid Rezyl 99–5, which is a non-drying alkyd resin. From the resulting admixture, films were prepared and baked as in Example I, and the results were as follows:

Table D

| Wt. Percent Rezyl 99-5 Resin Based on Total Resin | Flexibility a | Hardness b |
|---|---|---|
| 25 | 1/4 | 48 |
| 30 | 1/8 | 44 |
| 35 | 1/8 | 46 |
| 40 | 1/8 | 48 | a See footnote (a) Table A.
b See footnote (b) Table A.

The data show that at least 30% of the alkyd resin must be employed in order to obtain a modified resin which will pass the ⅛-inch mandrel test.

However, when this 30% modified resin was subjected to a boiling sodium hydroxide solution in a test such as described in Example IV, the exposed portion of the film was greatly cracked and discolored, probably because of the presence of ester linkages in the alkyd resin-modified urea resins. The resins having a higher alkyd resin content showed even greater effects of hydrolysis upon exposure to such rigorous tests. In other words, the resistance of these films to alkaline hydrolysis is an inverse function of the percentage of alkyd resin in the resin mixture. When the alkyd is kept at the necessary minimum to give satisfactory resistance to alkaline hydrolysis, the flexibility of the films is unsatisfactory, and vice versa.

It is to be understood that variations in the preparation and use of the trimethylol-modified urea resins will become apparent to those skilled in the art without departing from the scope of this invention. For instance, the modified resins of this invention may advantageously be used in molding resins and the like.

Having described the general nature and specific embodiments of the present invention, the true scope is now particularly pointed out in the appended claims.

What is claimed is:

1. A heat hardenable composition which comprises a mixture of the alcoholated condensation product of 1 mole of a urea compound selected from the group consisting of urea, thiourea, guanidine, methyl urea, acetyl urea, benzoyl urea, phenylthiourea, asymmetrical diethyl urea, allyl urea, 2-chloro allyl urea, ethylidene urea, methylol urea, methylene urea, acetylene urea, cyanuric acid, ethylene urea, dicyandiamide, guanylurea, guanylthiourea, biguanidine, aminoguanidine, creatine, guanoline, and mixtures thereof and about 1 to 2 moles of a $C_1$ to $C_3$ aliphatic aldehyde etherified with about 0.1 to 0.4 mole of a saturated aliphatic monohydric alcohol having 1 to 13 carbon atoms and 5 to 30 wt. percent, based on the final composition, of a 1,1,1-trimethylolalkane having between 5 and 13 carbon atoms.

2. A resinous composition which comprises the etherification product formed by heating the alcoholated condensation product of 1 mole of a urea compound selected from the group consisting of urea, thiourea, guanidine, methyl urea, acetyl urea, benzoyl urea, phenylthiourea, asymmetrical diethyl urea, allyl urea, 2-chloro allyl urea, ethylidene urea, methylol urea, methylene urea, acetylene urea, cyanuric acid, ethylene urea, dicyandiamide, guanylurea, guanylthiourea, biguanidine, aminoguanidine, creatine, guanoline, and mixtures thereof and about 1 to 2 moles of a $C_1$ to $C_3$ aliphatic aldehyde with about 0.1 to 0.4 mole of a saturated aliphatic monohydric alcohol having 1 to 13 carbon atoms crosslinked with 5 to 30 wt. percent, based on the final resin composition, of a 1,1,1-trimethylolalkane having between 5 and 13 carbon atoms.

3. A resinous composition according to claim 2 in which the urea compound is urea, the aliphatic aldehyde is formaldehyde and the trimethylolalkane is 1,1,1-trimethylolheptane.

4. A resinous composition which comprises the etherification product formed by heating the methylolated condensation product of 1 mole of urea and about 1 to 2 moles of formaldehyde with about 0.1 to 0.4 mole of a saturated aliphatic monohydric alcohol having 3 to 8 carbon atoms crosslinked with 5 to 15 wt. percent, based on the final resin composition, of a 1,1,1-trimethylolalkane having between 8 and 11 carbon atoms.

5. A process for preparing a urea resin which comprises mixing 1 mole of a urea compound selected from the group consisting of urea, thiourea, guanidine, methyl urea, acetyl urea, benzoyl urea, phenylthiourea, asymmetrical diethyl urea, allyl urea, 2-chloro allyl urea, ethylidene urea, methylol urea, methylene urea, acetylene urea, cyanuric acid, ethylene urea, dicyandiamide, guanylurea, guanylthiourea, biguanidine, aminoguanidine, creatine, guanoline and mixtures thereof and about 1 to 2 moles of a $C_1$ to $C_3$ aliphatic aldehyde in an alkaline aqueous medium at a temperature between 20 and 75° C., to form a condensation product, heating the resulting condensation product with about 0.1 to 0.4 mole of a saturated aliphatic monohydric alcohol having 3 to 8 carbon atoms at a temperature of 80 to 200° C. to form an ether, mixing the resulting ether with about 5 to 30 wt. percent, based on the final resin composition, of a 1,1,1-trimethylolalkane having 5 to 13 carbon atoms and baking the mixture at a temperature between about 65 and 200° C. until the resin is formed.

6. A process for preparing a urea resin which comprises mixing urea with formaldehyde in an alkaline aqueous medium at a temperature between 20 and 75° C. to form a condensation product, heating the resulting condensation product with about 0.1 to 0.4 mole of a saturated aliphatic monohydric alcohol having 3 to 8 carbon atoms at a temperature of 80 to 200° C. to form a partially polymerized ether, mixing the resulting partially polymerized ether with about 5 to 15 wt. percent, based on the final resin composition, of a 1,1,1-trimethylolalkane having 5 to 13 carbon atoms and baking the mixture at a temperature between about 65 and 200° C. until the resin is formed.

7. A process for preparing a urea resin film of improved flexibility and alkaline resistance which comprises mixing urea with formaldehyde in an alkaline aqueous medium at a temperature between 20 and 75° C. to form a condensation product, heating the resulting condensation product with about 0.1 to 0.4 mole of a saturated aliphatic monohydric alcohol having 3 to 8 carbon atoms at a temperature of 80 to 200° C. to form a partially polymerized ether, mixing the resulting partially polymerized ether with about 5 to 30 wt. percent, based on the final resin composition, of a 1,1,1-trimethylolalkane having 5 to 13 carbon atoms, sheeting the mixture into a film about 0.5 to 1 mil thick and baking the film at a temperature between about 65 and 200° C.

References Cited in the file of this patent

UNITED STATES PATENTS

| | | |
|---|---|---|
| 2,385,320 | Greene et al. | Sept. 18, 1945 |
| 2,426,128 | Trowell | Aug. 19, 1947 |

FOREIGN PATENTS

| | | |
|---|---|---|
| 320,915 | Great Britain | Oct. 28, 1929 |
| 521,380 | Great Britain | May 20, 1940 |